Patented Mar. 28, 1933

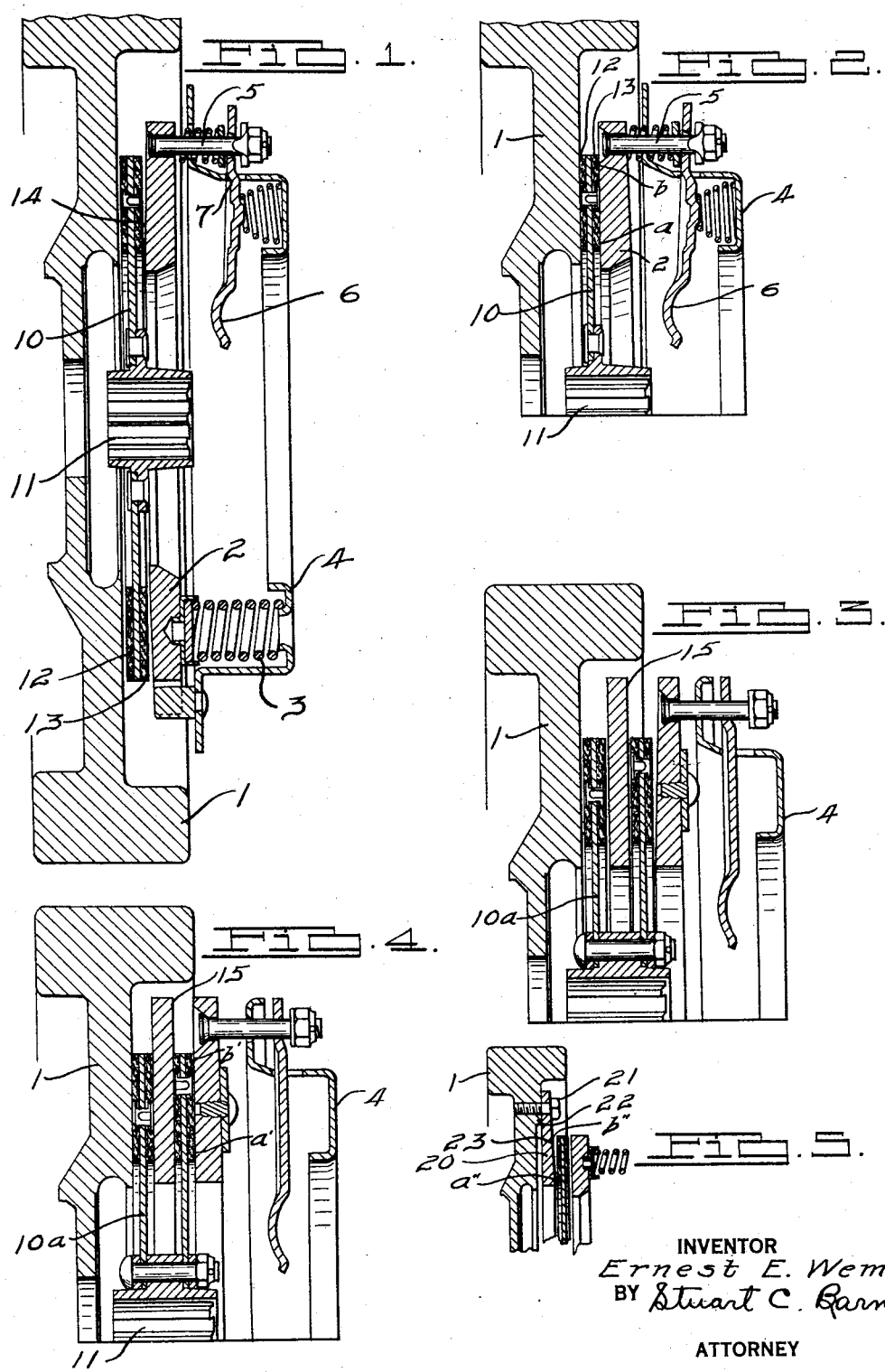

1,903,275

UNITED STATES PATENT OFFICE

ERNEST E. WEMP, OF DETROIT, MICHIGAN

CLUTCH

Application filed January 18, 1930. Serial No. 421,690.

This invention relates to a clutch primarily intended for use in an automotive vehicle. The invention is concerned particularly with the provision of a clutch of an improved nature wherein a nicety of clutch action is added, but wherein the structural features are varied.

In clutches it has been proposed, as in my Patent #1,571,746, to provide for clutch engagement wherein the first engagement takes place on a relatively small surface, and indeed, on substantially a line contact between the driving and driven members with an increasing area of surface engagement in the final driving position. This has been effected by providing the driven member of the clutch having its part which supports the friction material extending angularly as regards the normal plane, which part is flexed from its natural condition when the clutch is fully engaged. In other words, the driven disc carries the clutch facing normally positioned so as to form a section of a cone, straightened out however, when packed by the driving parts.

The present invention contemplates providing for an action in a clutch wherein the first engagement is effective on a portion of the clutch lining and full clutch engagement effective on the whole area thereof without, however, employing a cone formation in the driven disc or discs as the case may be. The advantages of this will be apparent as the detailed description progresses.

In the accompanying drawing:

Fig. 1 is a sectional view illustrating a single plate clutch, in open position.

Fig. 2 is a similar view illustrating the clutch in an engaged position.

Fig. 3 is a view illustrating a multiple disc clutch, showing the same in open position.

Fig. 4 is a similar view of the same, illustrating the engaged position.

Fig. 5 illustrates a modified form of the invention.

In the drawing, the fly wheel of an engine is illustrated at 1 and the driving parts of the clutch consist of a pressure plate 2, packing springs 3 acting upon the pressure plate and backed up by cover plate 4; the pressure plate is retractable against the action of the packing springs 3 by bolts 5 which are associated with levers 6 fulcrumed as at 7, and which are rocked, as by means of the usual clutch pedal, to release the clutch.

The driven parts comprise driven disc 10 having a hub 11, designed to have a driving connection with a driven shaft (not shown) as by means of a spline connection. The driven disc carries clutch facing material 12 and 13.

By referring to Fig. 1, it will be observed that the face 14 of the pressure plate, normally falls away from the engaging face of the adjacent clutch facing material. In other words, the distance between the adjacent parts of the driven disc and the pressure plate gradually increases from the inner edge of the facing material in the driven disc to the outer edge. Because the pressure plate is a ring, the surface 14 is in the form of a section of the cone or frusto-conical. Fig. 2 depicts this construction in an exaggerated manner; this is for the purpose of clearness of disclosure, although in actual practice, the outer edge will lie in a plane about fifteen to twenty-five thousandths of an inch out of the plane of the inner edge. This may be accomplished by machining the face 14 of the pressure plate to get the desired angularity.

When the clutch is engaged, the pressure ring moves toward the fly wheel so that the driven disc is packed between the two. The first engagement occurs at the inner edge of the facing material 13 as illustrated at a. As the clutch pedal is gradually released allowing the packing springs 3 to gradually come into full force, the pressure plate is caused to be distorted or bent so that its face 14 eventually contacts with the entire face area of the friction material 13. In this action there is a gradual increase of contact starting at the point a and progressively increasing to the point b when the clutch is fully closed as illustrated in Fig. 2. The fly wheel and facing material 12 come together with their respective faces meeting over the entire area of the facing material 12 at once, but the packing pressure first applied at the point a is resisted by the fly wheel acting through an area on the material 12 very close to the inner edge of the material; this is because there is not sufficient strength in the driven disc 10 to transmit any substantial pressure against the fly wheel at a point removed from the line of engagement at $a$. Accordingly, even though there is no progressive change in the frictional engaging area between the fly wheel and material 12, yet practically the only effective engagement is that which lies substantially immediately opposite the engagement between the pressure plate and material 13.

It might be pointed out that even though the pressure plate is of quite a substantial strength yet the amount of flexing or distortion is relatively small and which distortion is effected by the packing pressure which runs into the hundreds of pounds.

The invention is equally applicable for a multiple disc clutch as of the type shown in Figs. 3 and 4 wherein two driven discs are provided. In this form like characters have been applied to like parts, but there is a second driven disc $10a$ lying between the fly wheel and the intermediate driving plate 15. In this form the pressure plate has an angularly disposed engaging face so as to engage the adjacent driven disc face at the point $a'$ and during the engaging action, the pressure plate is progressively flexed or distorted so that the area of engagement gradually increases from the point $a'$ to the point $b'$.

There are a number of advantages which are obtained in the structure of this invention. For example; where the driven disc is designed to be distorted or flexed, the material of the disc of necessity needs to be made of heavier and stronger stock so as to withstand this usage. With the present invention, the driven disc can be made of lighter stock so long as it has strength necessary to meet the torque as no other function is required of it. Again, the limits can be held much closer; that is to say, in the machining of a relatively heavy piece of metal such as the pressure plate, more accuracy can be had than that in the distortion of a relatively thin disc which is in the nature of a sheet of metal. It also may be pointed out that the actual machining of the pressure plate to provide the cone engaging face may be less than that desired because when the plate is assembled, the action of the pressure springs and clutch releasing mechanism acts on the pressure plate in such manner as to increase the shape of the cone. It is advantageous to make the driven discs light as this reduces the weight and resultant momentum of the driven parts, thus minimizing the tendency of continued rotation of the driven parts after the release of the clutch. This facilitates gear shifting.

This construction produces unequal pressure across the face of the pressure plate. It will be seen that the pressure at $a$ and $a'$ is the greatest because this pressure is obtained without any plate distortion; the pressure at $b$ and $b'$ is less because some of the power of the packing springs is expended in distorting the plate. There is accordingly, a progressive decrease of pressure from $a$ to $b$ and $a'$ to $b'$. This is desirable inasmuch as with a given torque the pressure varies inversely to the radius. Accordingly, a substantially ideal condition can be caused to exist in this structure for at the point $a$ on the small radius, the pressure is the maximum, while at the point $b$ at the large radius, the pressure is reduced; the several parts including the pressure plate and packing springs can be calculated so that the differential in the packing pressure across the face of the pressure plate varies properly with regards to the radius. In other words, the torque determined by the radius and pressure at $a$ is substantially the same as the torque determined by the pressure and radius at $b$ assuming, of course, that the co-efficient of friction and the number of plates are constant or known.

In the form shown in Fig. 5 the distortable element takes the form of a member which, instead of being the pressure plate, is a member which resists the force effected by the pressure plate. This member is, in fact, the pressure member because it resists with an effort equal to the pressure effected by the packing springs and pressure plate.

The several parts of the form shown in Fig. 5 which are common to the above described description have applied thereto, the same reference characters, and need not be redescribed. This form has a plate 20, held by the fly-wheel as by means of machine screws 21, and the plate is spaced from the fly-wheel which spacing may be accomplished by means of shoulder 22 on the fly-wheel. This plate is positioned to be engaged by the driven disc and it has the angular or frusto-conical face 23 which falls away from the driven disc in such manner that the outer edge is spaced from a driven disc more than the inner. In this form when the clutch is engaged, the first contact is at $a''$; the pressure effects flexing, distortion, or bending of the plate 20 until such time as the surface 23 contacts substantially over the entire surface of the friction material on the driven disc reaching to the point $b''$. This form may be utilized with the single disc type of clutch as shown, or with the double or multiple disc type as illustrated in Figs. 3 and 4.

I claim:

1. In a clutch, the combination of spaced driving parts including a pressure plate in the form of a solid ring, a driven disc provided with clutch facing material located between the said driving parts, means acting on the pressure plate for pressing it against the driven disc so that the driven disc is engaged between the two driving parts, said pressure plate having a face which engages the driven disc which is normally angularly disposed with respect to the driven disc whereby to first engage the driven disc facing material near its inner edge, said pressure plate being distorted or flexed by the packing means when the said parts are packed together to bring said angular face into substantially full contact with the driven disc facing material.

2. In a clutch, spaced driving parts including a single piece pressure ring, a driven disc between the said driving parts, means acting upon the pressure ring to pack it and the other driving part against the driven disc, said pressure ring having a driven disc engaging surface normally at an angle to the driven disc and said pressure ring being distorted or flexed by the packing means when the clutch is engaged, whereby the pressure ring first engages the driven disc on substantially a line contact with the engaging area progressively increasing as the pressure plate flexes.

3. In a clutch, driving parts including a single piece pressure plate, a driven disc adapted to be packed between the driving parts, means acting upon the pressure plate for effecting the packing pressure, said pressure plate having a driven disc engaging surface of frusto-conical form, and said pressure plate being flexed or distorted by the pressure means to bring said face into alignment with and engagement with the driven disc.

4. In a clutch, driving parts including a one-piece pressure plate, a driven disc adapted to be packed between the driving parts, means acting upon the pressure plate for effecting the packing pressure, said driven disc lying substantially in a common plane and the pressure plate having an engaging surface angularly disposed with respect to said plane, and said pressure plate being flexed or distorted by the packing means to bring said face into alignment with and engagement with the driven disc.

5. In a clutch, driving parts including a pressure plate, of single piece construction in ring form, a driven disc adapted to be packed between the driving parts, means acting upon the pressure plate for effecting the packing pressure, said driven disc being of relatively light construction and lying substantially in a single plane and said pressure plate having a driven disc engaging surface of frusto-conical from, said pressure plate being distorted or flexed by the packing means to bring said surface substantially into alignment with and in engagement with the driven disc.

6. In a clutch, driving parts including a relatively thick pressure plate, a driven disc adapted to be packed between the driving parts, said driven disc having means of considerable width radially with which the driving parts engage, the pressure plate having a driven disc engaging face normally frusto-conical in shape and arranged to engage the driven disc near the inner edge of said face upon clutch engagement, and said relatively thick pressure plate being distorted or flexed under packing action to bring said face into substantial alignment with the driven disc and engagement therewith by substantially the entire surface of said face, said distortion or flexing utilizing some of the force of the packing means whereby unequal packing pressure exists across the face of the pressure plate.

7. In a clutch, driving parts including a relatively thick pressure plate, a driven disc adapted to be packed between the driving parts, said driven disc having means of considerable width radially with which the driving parts engage, the pressure plate having a driven disc engaging face normally frusto-conical in shape and arranged to engage the driven disc near the inner edge of said face upon clutch engagement, and said relatively thick pressure plate being distorted or flexed under packing action to bring said face into substantial alignment with the driven disc and engagement therewith by substantially the entire surface of said face, said distortion or flexing utilizing some of the force of the packing means whereby unequal packing pressure exists across the face of the pressure plate, said pressures being the greatest near the inner edge of the plate and less near the outer edge of the plate.

8. A pressure plate for a clutch comprising a ring-like member having an engaging face normally frusto-conical in shape and which plate itself is distortable under packing pressure to bring said face into a position substantially perpendicular to the axis of the plate.

9. A pressure plate for a clutch comprising a one-piece ring-like member having one face thereof machined to present a frusto-conical surface, said plate being distortable so that under packing pressure in a clutch said frusto-conical surface is caused to take a position substantially perpendicular to the axis of the plate.

10. In a clutch, driving parts capable of relative movement, a driven disc between the parts, packing means for moving the driving parts together to pack the driven disc between them, one of said driving parts being in the form of a metallic ring having an engaging surface normally frusto-conical in shape, said part being distortable under packing pressure to bring said face substantially to the perpendicular of the axis of the driven disc when the clutch is fully engaged, whereby the first line of engagement is near the inner edge of the driven disc and which engagement is substantially entirely over the engaged part of the driven disc when the clutch is fully engaged.

11. In a clutch, the combination of a driving member, a pressure ring which is also a driving member axially spaced from the first mentioned driving member, a driven disc having facings positioned between the driving member and pressure ring, packing means acting upon the pressure ring axially to pack the pressure ring and driving member together with the driven disc packed between them with the driving member and pressure ring engaging the driven disc facings, the engaging face of the pressure ring being normally frusto-conical in shape adapted to initially engage the facing substantially on its inner peripheral edge, and said pressure ring being subject to flexing by action of the packing means and to a plane substantially perpendicular to the axis to engage the driven member facing across its face, the flexure of the pressure ring being calculated to produce diminishing packing pressure on the driven member facing from its inner peripheral edge to its outer peripheral edge with the differential pressure varying as regards the radius to effect substantially a uniform torque capacity across said facing.

12. In a clutch, a driving member, a pressure ring, a driven disc having a ring of facing material on each side positioned between the driving member and pressure ring, packing means for urging the pressure ring towards the driven member whereby to pack it between said pressure ring and driving member, the engaging face of the pressure ring being normally frusto-conical, and said pressure ring being subject to flexure whereby in packing action the pressure ring initially engages a facing ring substantially at its inner peripheral edge and when flexed engages the facing ring substantially across its face, the flexure of the pressure ring being calculated so that the force required to flex the same effects a substantially predetermined progressively diminishing packing pressure on the facing ring from its inner peripheral edge to its outer peripheral edge with such predetermined pressures varying in accordance with varying radii to effect substantially a uniform torque capacity across the facing material.

13. In a clutch, two normally spaced rotary driving elements, a driven element provided with clutch facings positioned between the driving elements with the clutch facings substantially perpendicular to the axis of rotation, packing means for urging one driving member axially to pack the driven member between them, the engaging face of one driving element being frusto-conical and subject to flexure by packing action whereby to first engage the facing substantially at its inner peripheral edge and to engage the facing across its surface when flexed in full packed position whereby to produce greater packing pressure at the inner edge of the facing than at the outer, the flexure of the driving member and the power of the packing means being calculated to produce a predetermined progressively diminishing packing pressure across the facing from inner to outer edge to effect a substantially uniform torque capacity across the clutch facing.

14. In a clutch, a flywheel, a single piece pressure ring having a frusto-conical face, a driven disc with rings of facing material thereon positioned between flywheel and pressure ring, packing means acting upon the pressure ring for packing the driven disc between the flywheel and pressure ring, said pressure ring being flexed by the packing means in full packed position whereby the frusto-conical face is brought substantially perpendicular to the axis of rotation to engage the facing material across the face thereof with progressively diminishing packing pressure from the inner peripheral edge to the outer peripheral edge of the facing material, the flexure of the pressure ring being calculated to produce predetermined progressively diminishing packing pressure varying in accordance with the radii to effect substantially a uniform torque capacity across the face of the facing material.

In testimony whereof I have affixed my signature.

ERNEST E. WEMP.